US006546610B2

(12) United States Patent
Klann

(10) Patent No.: US 6,546,610 B2
(45) Date of Patent: Apr. 15, 2003

(54) DEVICE FOR LOOSENING A SCREW SEATED TIGHTLY IN A MOUNTING HOLE OF A BEARING EYE OR THE LIKE

(75) Inventor: Horst Klann, Villingen-Schwenningen (DE)

(73) Assignee: Klann Tools Ltd. (GB)

( * ) Notice: Subject to any disclaimer, the term of this patent is extended or adjusted under 35 U.S.C. 154(b) by 67 days.

(21) Appl. No.: 09/804,425

(22) Filed: Mar. 12, 2001

(65) Prior Publication Data

US 2001/0020323 A1 Sep. 13, 2001

(30) Foreign Application Priority Data

Mar. 13, 2000 (DE) .................................... 200 04 486 U
Mar. 13, 2000 (DE) .................................... 200 04 485 U

(51) Int. Cl.[7] ................................................ B23P 19/04
(52) U.S. Cl. ....................................................... 29/257
(58) Field of Search .......................... 29/256, 257, 263

(56) References Cited

U.S. PATENT DOCUMENTS 848,252 A * 3/1907 Kitterman .................... 29/257
1,344,700 A * 6/1920 Loomis ........................ 29/257
3,234,634 A * 2/1966 Johnson et al. ............... 29/257

FOREIGN PATENT DOCUMENTS

| | | |
|---|---|---|
| DE | 6901578 | 1/1969 |
| DE | 298 05 584 U1 | 7/1998 |

* cited by examiner

*Primary Examiner*—Robert C. Watson
(74) *Attorney, Agent, or Firm*—McGlew and Tuttle, P.C.

(57) ABSTRACT

A device for removing a screw (63) or pin tightly seated in a mounting hole of a bearing eye (45) or the like, especially a pivot pin (49, 50) or axle components (45, 25, 26, 27) of a motor vehicle axle is provided. To attach the device to the bearing eye (45) in the area of the screw (63 ), a support body (1) with a lateral support wall (2) is provided, wherein the support body (1) has a pressing device acting on the screw (63). To reach extremely strong pressing forces to loosen and/or press out the screw (63) or the pin, the pressing device (85) has a guide cylinder (99), in which a stud (97) is guided axially displaceably in a guide hole (99). A screw-down nut (91), which is screwed onto the guide cylinder (86) and is provided with a pressing surface (95) acting on the stud (97), is provided for the axial displacement of the stud (97).

18 Claims, 4 Drawing Sheets

DEVICE FOR LOOSENING A SCREW SEATED TIGHTLY IN A MOUNTING HOLE OF A BEARING EYE OR THE LIKE

FIELD OF THE INVENTION

The present invention pertains to a device for removing a screw or pin tightly seated in a mounting hole of a bearing eye or the like, especially a tightening screw or fastening screw of a pivot pin or the axle component of a motor vehicle axle, with a support body having a lateral support wall, with which support wall the support body can be attached to the bearing eye in the area of the screw, wherein the support body is provided with a pressing device acting on the screw.

BACKGROUND OF THE INVENTION

Motor vehicle axles in which essentially cylindrical pivot pins are held clampingly in a bearing bore of a slotted bearing eye have been known. The pivot pin is part of a ball-and-socket joint, which is arranged, e.g., at the outer end of a suspension arm of a motor vehicle axle. The bearing eye with its bearing bore for receiving the pivot pin may be arranged, e.g., at the upper end of a steering knuckle of the motor vehicle axle. To hold the pivot pin tightly in the bearing bore, the bearing eye has a clamping slot, which extends radially in relation to the bearing eye in the area of the bearing bore and by which two clamping flanges are formed, which are provided with a corresponding mounting hole for a tightening screw. In cooperation with a tensioning nut which can be screwed onto the tightening screw, the bearing bore can be tensioned by the tightening screw. The pivot pin is tensioned in a tightly seated manner in the bearing bore by this clamping operation. To also ensure that the pivot pin cannot slip out of the bearing bore even when the tightening screw is loosened but not removed, this tightening screw is arranged, extending at right angles to the bearing bore, at a radially spaced location from the bearing bore, at which the tightening screw laterally protrudes at least partially into the bearing bore. The pivot pin correspondingly has a circular mounting groove, into which the tightening screw protrudes in the mounted state. Thus, there is a positive-locking connection between the tightening screw and the pivot pin via the circular mounting groove of the pivot pin, so that the pivot pin cannot slip out of the bearing bore of the slotted bearing eye even when the tightening screw is loose.

It has been found with this type of joint connections that the tightening screw rusts into its mounting holes after a prolonged operating time and thus can be removed only with difficulty. It is sometimes necessary to heat the bearing eye in order to be able to move the tightening screw in the mounting holes at all. However, the ball-and-socket joints, which are provided with rubber cuffs toward the bearing eye, are very greatly affected by this heating of the bearing eye. The consequence of this is in turn that during simple repair work, during which the ball-and-socket joints are actually not to be replaced, these ball-and-socket joints are damaged and must be additionally replaced, as a result of which the repair costs increase considerably. However, since the tightening screw partially protrudes into the bearing bores of the pivot pins, complete removal of the tightening screw is absolutely necessary for the removal of the pivot pins from their bearing bores.

For example, a device which is intended especially for pressing out pivot pins of a steering linkage of motor vehicles has been known from DE-GM 69 01 578. However, this device is suitable only for pressing out conical pivot pins which become completely loosened after a short pressing-out movement simply because of their conical design in the bearing bore of the pivot pin, which likewise has a correspondingly conical design. For support in the area of the bearing eye, this device has a support body with a support wall arranged at right angles to the longitudinal extension of the device in the form of a support fork. A threaded cylinder with internal threads, which is arranged approximately concentrically to and opposite the support fork, is provided at the other end of the support body opposite the support fork. A pressing spindle acting as a pressing device, by means of which the pivot pin can be loosened in the bearing eye with the prior-art device attached to the bearing eye, is screwed into the threaded cylinder. It was now found that this device is not suitable for pressing out an extremely tightly seated tightening screw of the above-described type because especially the part of the pressing spindle that points toward the bearing eye and presses the threaded section of the tightening screw always becomes deformed. Furthermore, great wear can also be observed on the thread of the pressing spindle if this prior-art device is frequently used to press out extremely tightly seated :pivot pins. However, the internal threads of the threaded cylinder will also be damaged by this wear over time, so that this device cannot be used any longer already after a short time.

Furthermore, motor vehicle axles in which shock absorbers are fastened to the axle body via a bearing eye have been known. The bearing eye has a mounting hole for this, through which a fastening screw is passed. The bearing eye of the shock absorber is mounted between two bearing flanges, through which the fastening screw passes as well. To securely hold the bearing eye between the bearing flanges, the fastening screw is provided with a retaining nut. It was also observed in this case of connection that the fastening screw can rust into the mounting hole of the bearing eye after a prolonged operating time of the vehicle and its removal, e.g., to replace the shock absorber, is extremely difficult. The fastening screw is frequently seated in the mounting hole so tightly that it cannot be loosened and pushed out with conventional means any longer. The above-mentioned prior-art device is also unsuitable for loosening such fastening screws, because the pressing spindle is also damaged in the case of extremely strong pressing forces.

SUMMARY AND OBJECTS OF THE INVENTION

The basic object of the present invention is therefore to provide a device by means of which extremely strong pressing forces can be applied to loosen and/or press out a screw or pin tightly seated in a mounting hole without the device being subject to increased wear.

The object is accomplished according to the present invention by the pressing device having a guide cylinder, in which a stud is guided axially displaceably in a guide hole for loosening and/or pressing out the screw and by a screw-down nut, which is screwed on the guide cylinder and is provided with a pressing surface acting on the stud, being provided for the axial displacement of the stud.

Due to the design of the device according to the present invention, extremely tightly seated screws or a pin can be reliably pressed out of a corresponding mounting hole of a bearing seat without the device itself being able to be damaged.

The pressing device has for this purpose a guide cylinder in which a stud is guided axially displaceably. To guide the stud, a guide hole is provided, which can be pushed fittingly over the threaded section of the tightening screw or fastening screw projecting from the bearing eye with the stud withdrawn. To apply the necessary strong pressing-out force, a screw-down nut with a pressing surface is provided, which is screwed onto an external threaded section of the guide cylinder, which threaded section has a relatively large diameter. Due to this relatively large diameter of the threaded connection between the screw-down nut and the guide cylinder, extremely strong axial forces can be applied by the screw-down nut via its pressing surface on the stud without the threaded connection being able to be damaged. Deformations of or damage to the stud are also ruled out because the stud is securely guided in the guide hole of the guide cylinder and is protected from external effects. Furthermore, the threaded connection between the screw-down nut and the guide cylinder is designed such that the use of an impact screwdriver is possible without damage to this threaded connection. Due to this design according to the present invention, extremely tightly seated tightening screws can be reliably loosened with the pressing device according to the present invention, because an additional loosening effect is exerted on the tightening screw in its mounting hole by the impact impulses applied to the screw to be loosened by the impact screwdriver via the screw-down nut and the stud. This also applies, of course, to a pin seated in a mounting hole, e.g., a pivot pin of a ball-and-socket joint of a motor vehicle axle.

Due to a design according to an aspect of the invention, the support body has an additional, second support wall extending in parallel to the support wall in addition to its support wall. The pressing device is arranged approximately concentrically to the second support wall, opposite same in the first support wall. Extremely high stability of the support body with its two support walls is achieved due to this design.

Due to a design according to an aspect of the invention, the device according to the present invention can be used in an extremely variable manner. Due to the replaceable design of the guide cylinder, the latter can be adapted to the requirements and the particular intended use, especially in terms of its dimensions. Thus, a plurality of pressing devices may be provided, which can be replaced with one another in a simple manner depending on the intended use. To guarantee a defined attachment of the device to a bearing eye, the second support wall may have an opening, through which the tightening screw or fastening screw can be pushed during the pressing out. At the beginning of the pressing-out operation, this opening surrounds the screw head of the tightening screw or fastening screw at least partially, as a result of which the support body can be accurately positioned at the bearing eye via the screw head of the tightening screw or fastening screw. This opening could be, e.g., of a U-shaped design.

To further improve this guide function of the opening of the second support wall, this support wall is designed as a mounting hole for receiving the screw head. The support body is thus held in an accurate position at the bearing eye at least at the beginning of the pressing-out of the tightening screw or fastening screw. To guarantee the most centered action possible of the force during the pressing out or the loosening of the tightening screw or fastening screw by the pressing device, the mounting hole is arranged coaxially to the pressing device of the first support wall.

The opening of the second support wall may be part of a separate mounting cylinder, which is replaceably inserted and especially screwed into the second support wall. As a result, the device according to the present invention can be used in a variable manner, because a plurality of mounting cylinders can be provided, which also have mounting holes of different dimensions for adjustment to the size of the screw head of the screw to be loosened.

For more variable use, the guide cylinder and the mounting cylinder may be interchangeable with one another as desired and be screwed into the first or second support wall.

The guide cylinder and the mounting cylinder can be screwed into the respective support wall to the extent that the bearing eye is received approximately fittingly between the guide cylinder and the mounting cylinder. If the bearing eye is, e.g., that of a shock absorber, whose bearing eye is received between two bearing flanges of a motor vehicle axle, the depth of screwing in is to be set corresponding to the external dimensions of the bearing flanges receiving the bearing eye. However, an absolute limitation of the depth of screwing in is not absolutely necessary, because the larger dimensions of the two bearing flanges compared with the bearing eye located in between can also be taken into account by the guide cylinder and/or the mounting cylinder being screwed correspondingly less far into the corresponding support wall, without having to limit the depth of screwing in to this smaller amount.

By use of a hardened design of the stud, it is reliably prevented from being deformed even at the highest pressing forces, so that the stud is definitely unable to become jammed in the guide hole of the guide cylinder.

The stud may have a pressure piston, which is guided in a guide hole of the guide cylinder. The diameter of this guide hole is adapted to the diameter of the tightening screw. It is achieved as a result that the tightening screw or fastening screw is completely received in the guide hole with its threaded section projecting from the mounting hole of the bearing eye or of the bearing flanges at the beginning of the pressing operation. Accurate guiding and stabilization of this threaded section of the tightening screw or fastening screw is thus reliably guaranteed, so that this threaded section cannot undergo deformation even under the highest pressing forces and the tightening screw or fastening screw is reliably loosened in the mounting holes of the bearing eye.

The lateral support walls may be rigidly connected to one another via a rear wall. In addition to these lateral support walls, an upper support wall and a lower support wall, both of which extend approximately at right angles to the rear wall and at right angles to the lateral support walls, may be provided. Due to this design, the support body thus forms a kind of housing, which is open on one side and can be attached to the bearing seat in the area of the tightening screw or fastening screw. Furthermore, the upper or lower support wall may be provided as desired with a pressing-out opening for pressing out the pivot pin. The respective other of the upper or lower support walls has, by contrast, an approximately U-shaped opening. In the state attached to the bearing eye, this opening surrounds the pivot pin to be pressed out at least partly. At the same time, the support wall with the U-shaped opening is used for support on the bearing eye during the pressing out of the pivot pin and it correspondingly also absorbs the pressing forces. This pressing-out device thus acts essentially at right angles to the pressing device, which is intended for pressing out the tightening screw or fastening screw. An extremely dimensionally stable support body is obtained, which is designed such that, on the one hand, the tightening screw or fastening screw can be removed in a simple manner and, on the other hand, the pivot pin can be pressed out of its bearing bore in a very simple manner.

The pressing-out device for pressing out the pivot pin may be formed by a pressure screw, which is screwed through a corresponding threaded hole of the support wall as well as through the bearing bore of the pivot pin during the pressing out of a pivot pin. The length of this pressure screw is correspondingly also selected to be such that the pivot pin can be pressed completely through its bearing bore and can thus be reliably removed from the bearing bore.

The threaded hole for the pressure screw may be part of a spacer sleeve, which is tightly fastened, directed toward the outside, to one of the corresponding support walls. In the state in which the support body is attached to the bearing eye, this spacer sleeve extends coaxially to the bearing bore of the pivot pin to be pressed out.

If such a spacer sleeve is used, the threaded hole of this spacer sleeve is provided with a radially expanding, threadless guide section toward the support wall. At the same time, the pressure screw has a pressing section, which can be pressed essentially fittingly through the bearing bore of the bearing eye. Due to this design of the spacer sleeve together with the pressure screw with its threadless section, it is ensured that the thread of the pressure screw cannot be damaged during the pressing out of the pivot pin. The service life of the device according to the present invention is substantially prolonged as a result.

If two or more pivot pins are provided in a bearing eye, a plurality of pressing-out devices may be provided corresponding to the number of pivot pins to be pressed out. In the case of such a design, the distance between the two lateral support walls is increased corresponding to the clamping flanges, so that the support body can be attached to this bearing eye in a simple manner. After the removal of a tightening screw in the bearing eye, which tightening screw is provided for bracing together for both pivot pins, each pivot pin can be pressed out in one clamping due to the multiple arrangement of the pressing-out devices. The handling is thus simplified and the operations are expedited considerably.

Mutually interchangeable pressing devices of different designs may be provided, which can be interchanged with one another as needed. This design is advantageous, e.g., when an extremely long tightening screw or fastening screw must be pressed out. In this case, this tightening screw or fastening screw can first be loosened, e.g., with a pressing device. Once the tightening screw or fastening screw has been loosened, a pressing device of a simpler design, which comprises, e.g., a simple pressing screw of greater length, can be used for the further, complete pressing out of the tightening screw or fastening screw over the remaining, relatively long path from its bearing bore. This offers the advantage that the pressing device does not have to be made needlessly large for applying extremely strong pressing forces in order to achieve the extremely long pressing path.

As an alternative to the use of a second pressing device, it is also possible to provide a plurality of studs of various lengths, which can be inserted into the pressing device one after another as the pressing path increases in order to press the tightening screw or fastening screw completely out of its bearing bore. This means that a stud of a shorter length is first used to loosen the tightening screw or fastening screw. Once the tightening screw or fastening screw has been loosened and pressed through the bearing bore by a certain amount by this stud of shorter length, a second stud is inserted, which is longer, e.g., by this pressing path. The tightening screw or fastening screw can now be pressed out of the bearing bore by an additional amount by this second stud. If this pressing path is not yet sufficient, either, another pressing bolt may be provided, which is again longer by the pressing path that can be reached with the second pressing bolt. Complete pressing out of the tightening screw or fastening screw can thus be achieved by using a plurality of pressing bolts of different, mutually coordinated lengths. It is advantageous in this connection that an impact screwdriver can be used to actuate the pressing device for the complete pressing path because of the extremely stable design of the pressing device, so that a shorter working time can be achieved even if the stud must be replaced several times.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
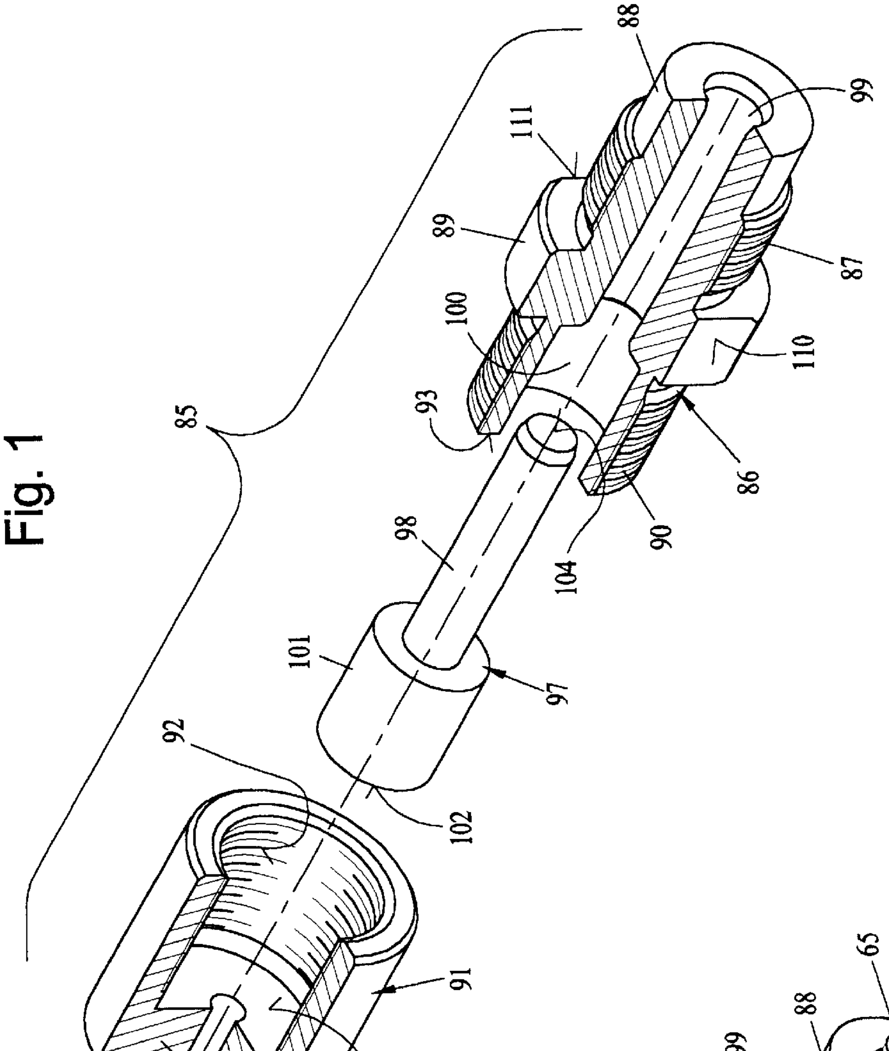
FIG. 1 is a perspective exploded view, partially in section, of a pressing device according to the present invention.
Figure 2:
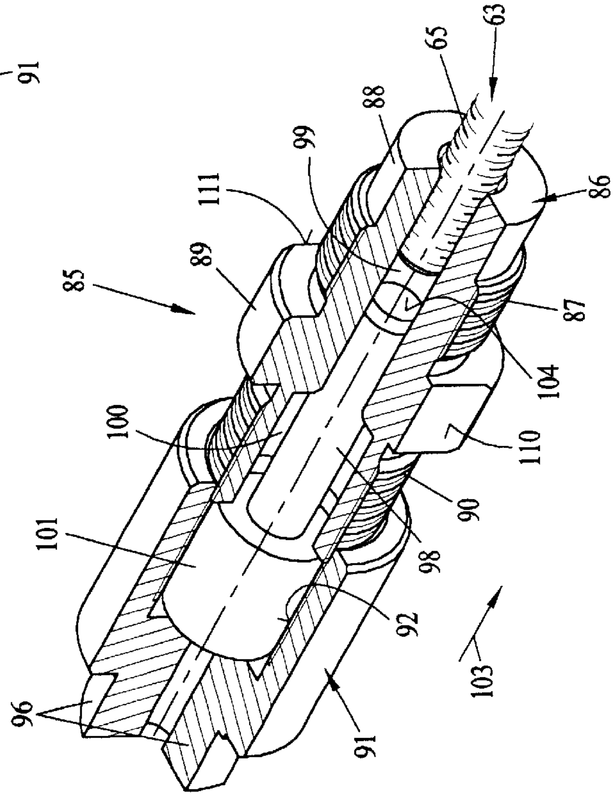
FIG. 2 is a perspective view, partially in section, of the pressing device from FIG. 1 in the mounted state.
Figure 3:
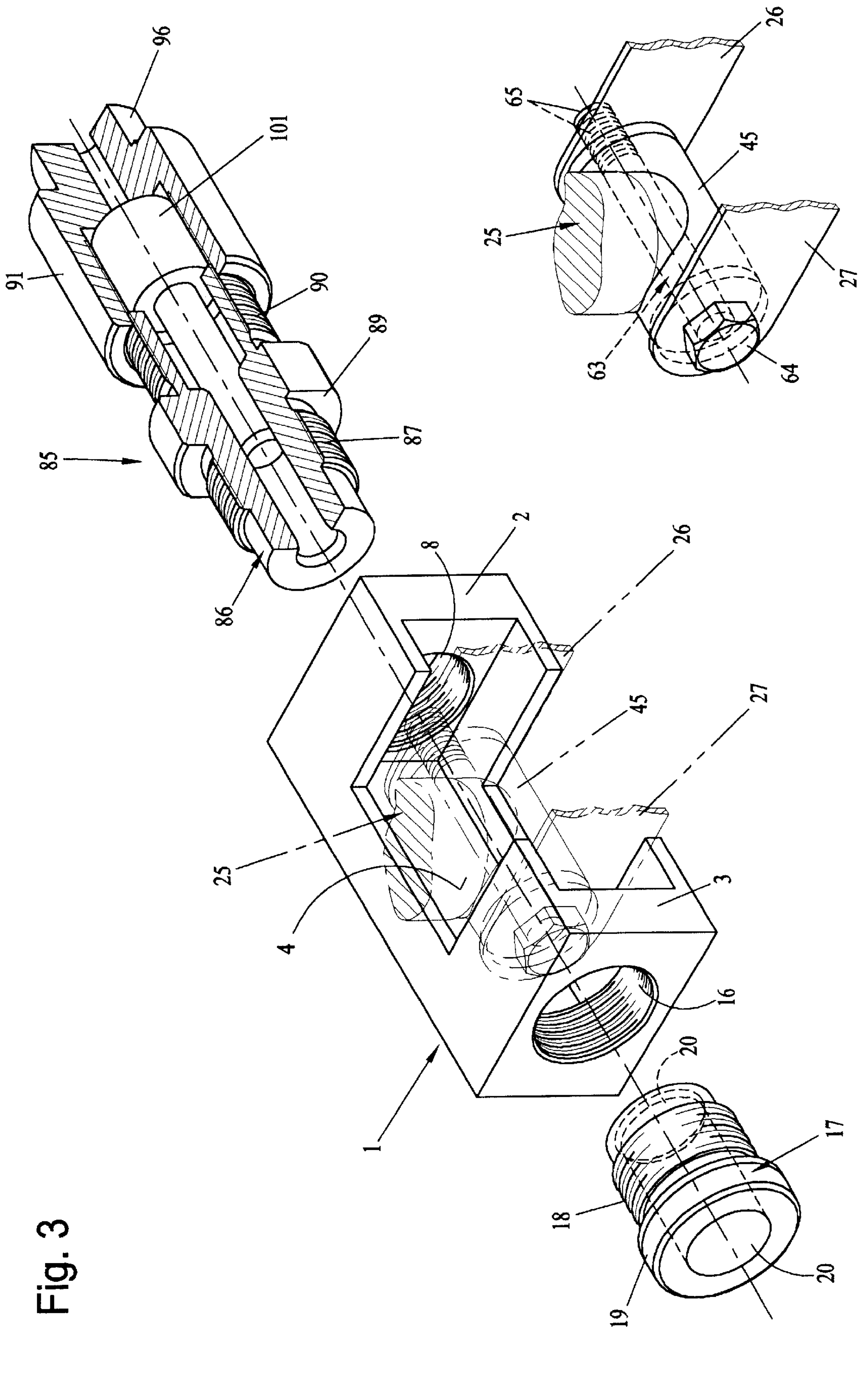
FIG. 3 is a perspective view of the pressing device from FIG. 2 together with a support body and a bearing eye of a shock absorber.
Figure 4:
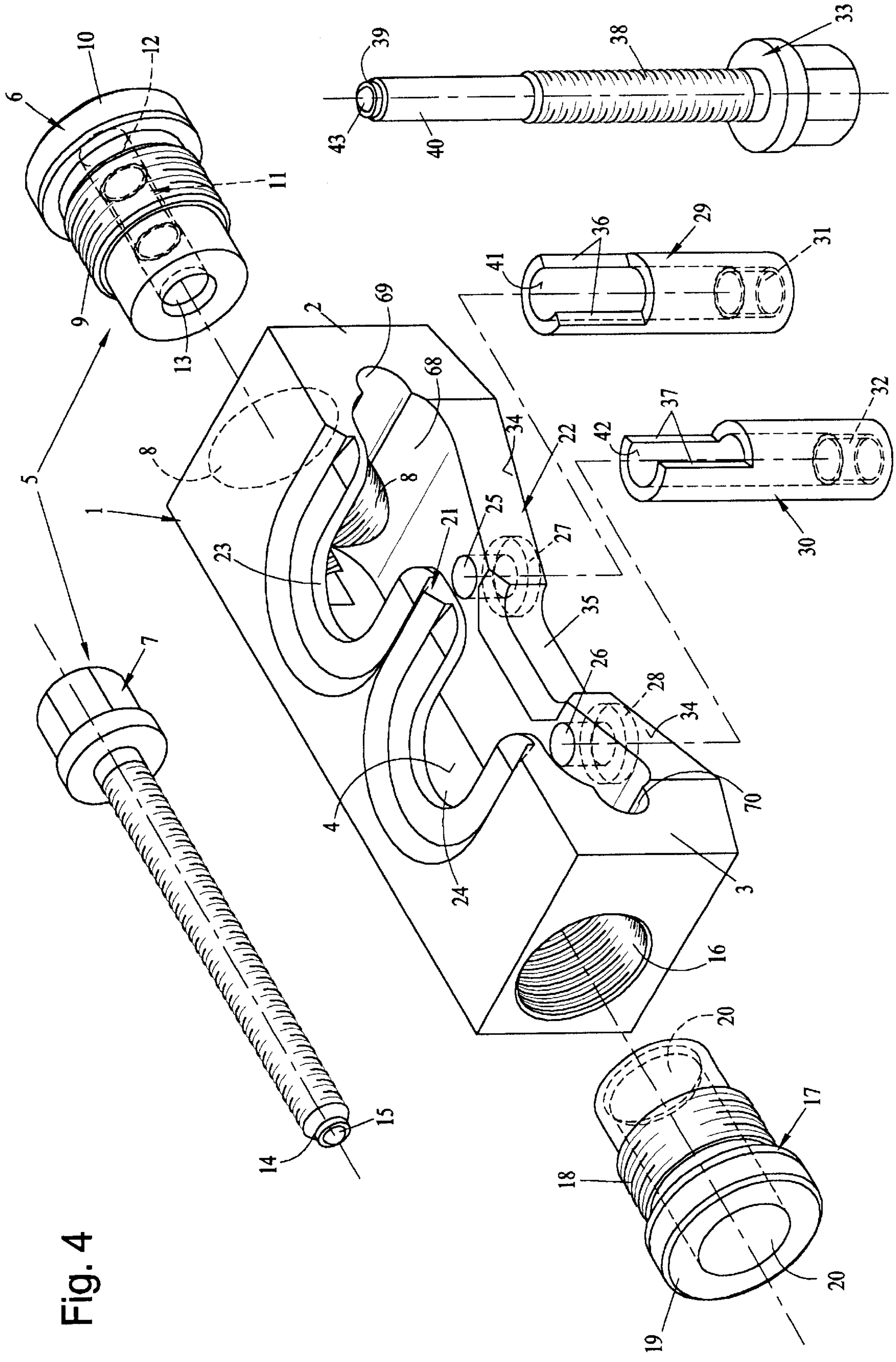
FIG. 4 is a perspective exploded view of a second exemplary embodiment of a support body with a second pressing device for pressing out an already loosened screw.

Referring to the drawings in particular, FIGS. 1 and 2 show a pressing device 85, which can be used, e.g., with the support bodies 1 shown in FIGS. 3 and 4. This pressing device 85 is used especially to loosen a tightening screw or fastening screw seated extremely tightly in a mounting hole of, e.g., a bearing eye. Such a tight seating of a screw may be brought about, e.g., by corrosion, so that the axial pressing forces of a prior-art pressing means are either insufficient for pushing out the screw, or the pressing devices themselves are damaged.

To make it possible to apply such strong pressing-out forces as well, the pressing device 85 according to the present invention comprises a guide cylinder 86, whose front end in FIG. 1 is provided with an external threaded section 87 as well as a cylinder section 88. To achieve a tight holding of the guide cylinder 86 in one of the threaded holes 8 or 16 of the lateral support walls 2 or 3 of a support body 1 (FIG. 3), the guide cylinder 86 is provided with a radially expanded stop collar 89, which is provided on its circumference with two wrench surfaces 110 and 111, via which the guide cylinder 86 can be screwed tightly into the respective threaded holes 8 and 16 with a corresponding wrench tool. At its end located opposite the threaded section 87 and the cylinder section 88, the cylinder section 88 is provided with another external thread 90, onto which a screw-down nut 91 designed as a kind of union nut can be screwed.

This screw-down nut 91 has for this purpose an internal thread 92, whose depth corresponds essentially to the overall length of the external thread 90 or of the axial distance between the stop collar 89 and the rear front surface 93 of the guide cylinder 86. At the inner end of the internal thread 92, the screw-down nut 91 is provided with a pressing wall 94, which forms a pressing surface 95 inside. This pressing wall 94 also has, on the outside, a driving hexagon 96, via which the screw-down nut 91 can be rotatingly driven by means of a suitable tool.

To loosen a fastening screw 63, which is seated tightly, e.g., in a bearing eye 45 (FIG. 3), a central, stepped stud 97 is provided toward the guide cylinder 86, and the stud 97 has a pressure piston 98, with which the stud 97 is guided axially displaceably in a guide hole 99 of the guide cylinder 86. The guide hole 99 has a radially expanded mounting section 100 toward the screw-down nut 91, and the mounting section 100 is 20 used for the axially displaceable support of a radially expanded pressing head 101 of the stud 97, which the pressing head 101 is adapted to the diameter of the mounting section 100.

During operation, this pressing head 101 is supported with its rear front surface 102 over a large area on the inner pressing surface 95 of the screw-down nut 91, so that when the screw-down nut 91 is screwed onto the external thread 90 of the guide cylinder 86, the stud 97 is moved forward axially in the direction of the arrow 103 (FIG. 2). In this exemplary embodiment, the length of the pressure piston 98 corresponds essentially to the front guide section of the guide hole 99, which has a smaller diameter, but it may also be longer.

FIG. 2 shows the pressing device 85 in the preassembled state, in which it is screwed for use, e.g., into the threaded hole 8 of the first support wall 2 of the support body 1 (FIG. 3 or FIG. 4) with its guide cylinder 86. In this state, the threaded section 65 of the fastening screw 63, which the threaded section extends beyond the bearing eye 45, protrudes into the guide hole 99 of the guide cylinder 86, as is shown, e.g., in FIG. 2. The screw-down nut 91 is now turned forward in the direction of arrow 103 to the extent that the anterior front surface 104 of the pressure piston 98 comes into contact with the rear side of a threaded section 65 of the fastening screw 63, which threaded section 65 protrudes into the cylinder section 88. Since extremely strong axial forces are also needed to loosen an extremely tightly seated fastening screw 63, a tool, by means of which extremely high torques can be applied on the screw-down nut 91, is attached to the driving hexagon 96 of the screw-down nut 91. A so-called impact screwdriver, by which these torques can be transmitted to the screw-down nut 91 in a pulsed manner, is preferably used as such a tool. Extremely strong, pulsed axial forces are correspondingly transmitted by the screw-down nut 91 due to this impact screwdriver drive to the free threaded section 65 of the fastening screw 63 via the stud 97. Since the tightening screw 63 with its threaded section 65 is guided approximately without clearance in the guide hole 99, the axial force can be transmitted to same essentially without deformation of the fastening screw 63. After loosening the fastening screw 63 in the mounting hole of the bearing eye 45 (FIG. 3), the fastening screw 63 can be pressed out of the mounting hole manually.

Should the axial forces that can be applied manually be insufficient to completely remove the fastening screw 63 from the bearing eye 45, the pressing device according to the present invention may be replaced with a pressing device which has a pressing screw 7 (FIG. 4), which is screwed into a corresponding threaded hole 11 in another threaded cylinder 6, instead of the stud 97. This threaded cylinder 6 may have essentially the same design as the guide cylinder 86 of the pressing device 85 according to the present invention, but it has, instead of the guide hole 99, a through thread 11, through which the pressing screw 7 can be screwed to press out the fastening screw 63, as will be described below in connection with FIG. 4.

Due to the external thread 90 of larger diameter in conjunction with the internal thread 92 of the screw-down nut 91, extremely strong thread forces can be absorbed. To guarantee, furthermore, that no unintended deformations of either the pressure piston 89 or the pressing head 101, on the other hand, can occur due to the extremely high pressure load on the stud 97, the entire stud 97 is made of a hardened steel or another, highly loadable material.

Thus, as was described, an extremely tightly seated fastening screw 63 can be loosened by means of the pressing device 85 according to the present invention in a simple manner using, e.g., an impact screwdriver or another tool that applies high torques, so that the fastening screw can then be pressed out of the bearing eye 45 manually.

As is shown, e.g., in FIG. 3, the pressing device 85 according to the present invention can be attached to a bearing eye 45 using the support body 1. The bearing eye 45 is part of a shock absorber 25, which is shown only partially in FIG. 3. The bearing eye 45 of the shock absorber 25 is accommodated between two bearing flanges 26 and 27, which are part of a motor vehicle axle, which is not shown specifically in the drawing. The bearing eye 45 is known to be held by the fastening screw 63 on the bearing flanges 26 and 27. This [fastening screw] is provided with a threaded section 65 projecting to the rear from the bearing eye 45 and beyond the bearing flange 27 with a corresponding fastening nut. This fastening nut is already removed from the threaded section 65 in FIG. 3 and is therefore not shown.

To attach the support body 1 to the bearing eye 45 or the bearing flanges 26 and 27, the support body 1 is provided with a first and second support wall 2 and 3. These two support walls 2 and 3 have an inwardly directed, approximately U-shaped cross-sectional profile each and are connected to one another, extended approximately in parallel to one another, via a rearward rear wall 4 of the support body 1. As a result, a defined attachment of the support body 1 to the bearing eye 45 and to the two bearing flanges 26 and 27 is made possible, because these extend around the bearing flanges 26 and 27 in a positive-locking manner in the attached state. The bearing eye with the bearing flanges 26 and 27 is shown by phantom lines in FIG. 3.

The first support wall 2 has a threaded hole 8, into which the guide cylinder 86 of the pressing device 85 is screwed after the support body 1 has been attached to the bearing eye 45. To limit the depth of screwing in of the guide cylinder 86 into the threaded hole 8 of the support 2 to a defined amount, the guide cylinder 86 may be provided with the circular, radially outwardly directed stop collar 89.

As is also apparent from FIG. 3, the second support wall 3 also has a threaded hole 16, which is used for the interchangeable mounting of a separate mounting cylinder 17. This mounting cylinder 17 also has for this purpose an external threaded section 18, with which it can be screwed fittingly into the threaded hole 16 of the second support wall 3. The depth of screwing in of the mounting cylinder 17 may also be limited and defined by a radially expanded stop flange 19 extending circularly on the outside. Furthermore, the mounting cylinder 17 has a central through hole 20, which is used during use for the defined mounting of the screw head 64 of the fastening screw 63.

Provisions may also be made for the central through hole 20 to be arranged directly in the second support wall 3 and to receive the screw head 64 of the fastening screw 63 for the defined attachment of the support body 1 to the bearing eye 45. The arrangement of the central through hole 20 in the separate mounting cylinder 17 has, however, the advantage that the device according to the present invention can be adapted in a simple manner to different fastening screws 63 with screw heads 64 of various sizes. Furthermore, the threaded holes 8 and 16 have equal dimensions, so that the guide cylinder 86 of the pressing device 85 and the mounting cylinder 17 are interchangeable with one another. Thus, the device according to the present invention can be easily retrofitted and the support body 1 can be attached to different bearing eyes of an axle body, which are of a mirror symmetrical design.

Figures 5, 6:
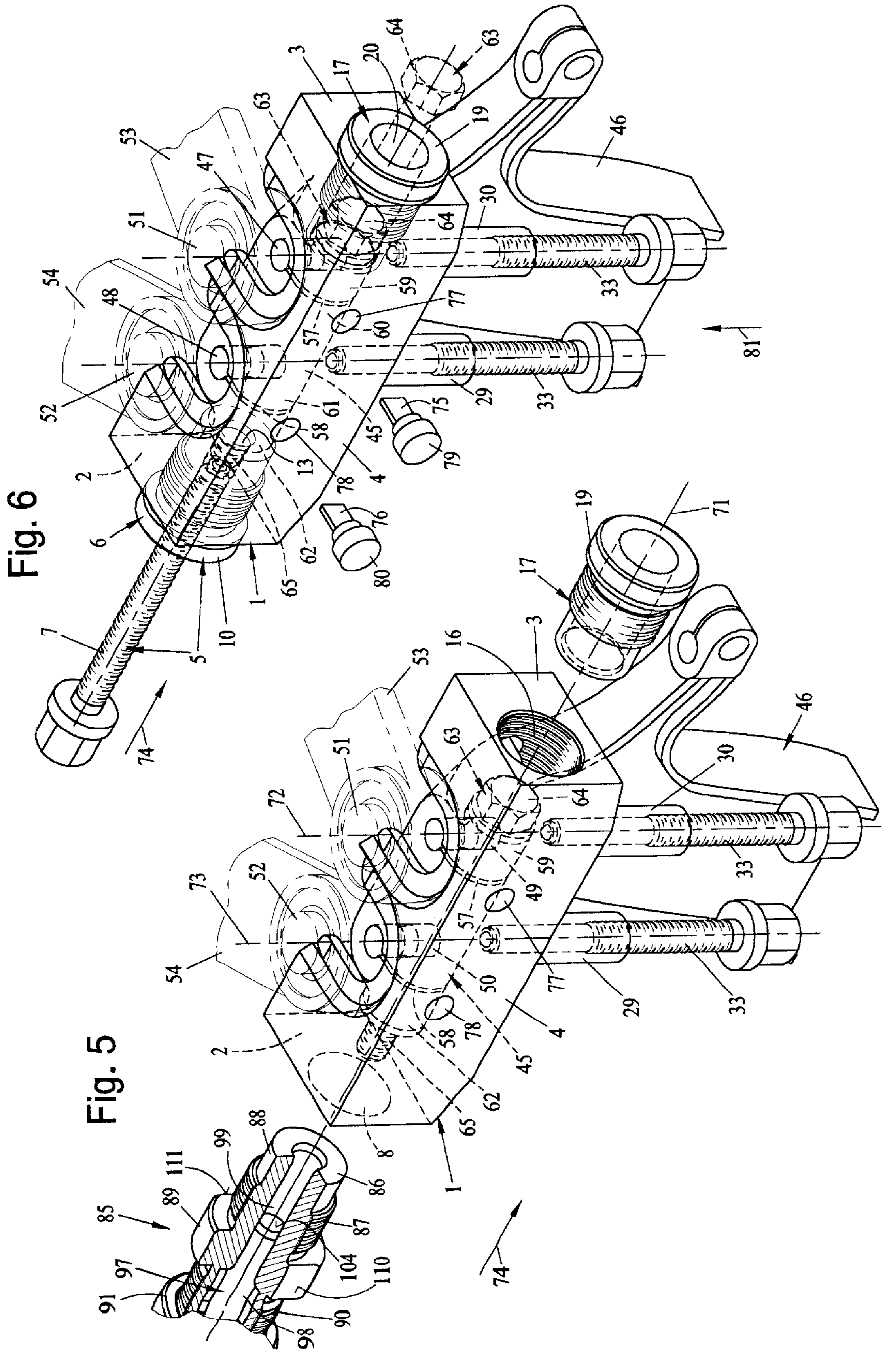
FIG. 5 is a perspective exploded view showing the device from FIG. 4 in a state in which it is attached to a bearing eye of an axle component with the pressing device according to FIGS. 1 and 2.
FIG. 6 is a perspective exploded view showing the device from FIG. 5 with the second pressing device after the loosening of the tightening screw.

FIG. 4 shows another exemplary embodiment of a support body 1, with which the pressing device 85 according to the present invention can be attached to a bearing eye 45 (FIGS. 5 and 6). The reference numbers used in FIG. 4 correspond to the reference numbers from FIG. 3 for the same components of the support device 1. The support body 1 from FIG. 4 is also provided with a first and second support wall 2 and 3. These two support walls 2 and 3 are connected to one another via a rearward rear wall 4 and extend essentially in parallel to one another. Furthermore, FIG. 4 shows another pressing device 5, which is formed by a threaded cylinder 6 and a pressing screw 7. This pressing device 5 is intended to press a corresponding tightening screw 63 (FIGS. 5 and 6) completely out of the mounting hole of a bearing eye 45 after the tightening screw 63 had been loosened by means of the pressing device 85 in the mounting hole before. To do so, the threaded cylinder 6 is screwed with a corresponding external thread 9 into the threaded hole 8 of the first support wall 2 instead of the guide cylinder 86 of the pressing device 85 with the support body 1 attached to the bearing eye 45 (FIGS. 5 and 6). To limit the depth of screwing in to a defined amount, the threaded cylinder 6 may be provided with a radially outwardly directed stop flange 10 at its outer end. Furthermore, the threaded cylinder 6 is provided with a central threaded hole 11 for the axially displaceable support of the pressing screw 7. To make it possible to insert the pressing screw 7 in the threaded hole 11 in a satisfactory manner, the threaded hole 11 is provided with a threadless, radially slightly expanded mounting section 12. In its end area located opposite the mounting section 12, the threaded hole 8 has, furthermore, a threadless guide section 13, in which the tightening screw 63, which is already loosened but not yet pushed back substantially in the axial direction, protrudes fittingly in the attached state at the bearing eye 45 of the steering knuckle, as is shown in FIG. 6.

At its free end on its front side 14, the pressing screw 7 has a pressing ball 15, with which the pressing screw 7 is held centered in a centering hole of a tightening screw of an axle body, which tightening screw is to be pressed out. This manner of centering is advantageous when the tightening screw 63 to be pressed out has a smaller diameter than the threadless guide section 13 of the threaded cylinder 6 and thus it can be received in this in an uncentered manner.

FIG. 4 also shows that the second support wall 3 also has a threaded hole 16, which is used for the replaceable mounting of a separate guide cylinder 17 or of the threaded cylinder 6 as desired. This guide cylinder 17 also has an external thread 18 for this purpose, with which it can be screwed fittingly into the threaded hole 16 of the second support wall 3. The depth of screwing in of the guide cylinder 17 is also limited by a circular, radially expanded stop flange 19 extending circularly on the outside. Furthermore, the guide cylinder 17 has a central through hole 20, which is used during use for the defined mounting of the screw head 64 of the tightening screw 63 (FIGS. 5 and 6). Due to different guide cylinders 17 with through holes 20 of different diameters being provided, the support body 1 can be adapted to different tightening screws with screw heads of different sizes in a simple manner. Furthermore, the threaded holes 8 and 16 have equal dimensions, so that the threaded cylinder 6 and the guide cylinder 17 are interchangeable with one another. The device according to the present invention can thus be retrofitted in a simple manner and the support body 1 can be attached to different bearing eyes of an axle body, which are of mirror symmetrical design.

FIG. 4 also shows that the two support walls 2 and 3 have an essentially U-shaped cross-sectional profile, so that they surround a bearing eye of an axle body in the attached state at least partially. As a result, accurate alignment of the support body 1 at such a bearing eye is made possible as well. In the special embodiment according to FIG. 4, an upper support wall 21 and a lower support wall 22 are also provided in addition to the two lateral first and second support walls 2 and 3. These two support walls 21 and 22 are a one-piece part of the support body 1 and connect the two lateral support walls 2 and 3 to one another. Thus, the support body 1 forms a kind of mounting housing in this exemplary embodiment, which is open on one side and can be pushed over the bearing eye 45 of the axle body 46 in a simple manner, as is shown in FIGS. 5 and 6.

The upper support wall 21 is provided with two, approximately U-shaped openings 23 and 24, which also partially surround a pivot pin 49, 50 to be pressed out in the state attached to the bearing eye, as will be described below in connection with FIGS. 5 and 6.

The lower support wall 22 is provided with two through holes 25 and 26, which are arranged coaxially to and opposite the U-shaped openings 23, 24. On the underside, these through holes 25 and 26 have radially expanded depressions 27 and 28 (indicated by broken line), which are used to fittingly receive two spacer sleeves 29 and 30. In the mounted state, these two spacer sleeves 29 and 30 are welded into the respective corresponding depression 27 and 28, extending coaxially to the through holes 25 and 26. The two spacer sleeves 29 and 30 are provided in their lower end area with threaded sections 31 and 32, which are used, together with a pressure screw 33, [as] a pressing-out device for pressing out one pivot pin 49, 50 each. FIG. 4 shows only one of the pressure screws 33, which has an identical design for both spacer sleeves 29 and 30.

Depending on the intended purpose, the lower support wall 22 may have a V-shaped cutout 34, which opens centrally into an approximately U-shaped opening 35. Such a design of the lower support wall 22 may be necessary for adaptation to the shape of an axle body, which has projecting shaped elements in corresponding areas. These shaped components of the axle body thus protrude fittingly into both the V-shaped cutout 34 and the U-shaped opening 35 in the attached state of the support body 1 at the bearing eye. The spacer sleeves 29 and 30 also have openings 36 and 37 in their upper end directed toward the lower support wall 22 in this exemplary embodiment according to FIG. 4, and a shaped element of an axle body also protrudes into these openings in the attached state. To prevent the screw thread 38 of the pressure screw 33 from being damaged by such a shaped part of an axle body during the pressing-out operation, the screw thread 38 of the pressure screw 33 ends at a spaced location under the upper front side 39. The pressure screw 33 correspondingly forms a threadless pressing section 40 in this upper end area.

For manufacturing reasons, to eliminate the need to cut a thread over the entire length of the two spacer sleeves 29 and 30, the two spacer sleeves 29 and 30 are provided with a radially expanded, threadless guide section 41 and 42, respectively, above their respective threaded sections 31 and 32. Due to the threaded sleeves 29 and 30 being provided, in cooperation with the specially designed pressure screw 33, it is thus also possible to press out pivot pins of an axle body in which the axle body has outwardly projecting shaped parts protruding into the openings 36 and 37 in the area of its bearing eye. The threaded sections 31 and 32 to be provided for the pressing-out operation are arranged with this design at a distance from the lower support wall 22, so that the pressure screw 33 to be screwed through with its threaded section 38 cannot collide with these shaped parts and it can also be operated in a simple manner. In the case of axle bodies of a simpler design, which are not provided with such shaped parts, the threaded sections 31 and 32 may also be provided directly in the through holes 25 and 26 of the lower support wall 22. However, it is also necessary in this case to provide a pressure screw in which the threaded section 38 extends to the upper front side 39 of the pressure screw. FIG. 4 also shows that the pressure screw 33 also has a pressing ball 43 at its upper front side, and this pressing ball 43 is used for centering in a centering hole of a pivot pin, on the one hand, and for reducing the friction during the pressing out of a pivot pin, on the other hand.

FIG. 4 also shows that the two lateral support walls 2 and 3 have an outwardly directed opening 69 and 70, respectively, which are arranged symmetrically to the upper and lower support walls 21 and 22 and extend in parallel to the upper and lower support walls 21, 22. When the support body 1 is attached to the bearing eye 45, as is shown in FIG. 5, the opening 69 is used to receive the free threaded section 65 of the tightening screw 63 projecting beyond the clamping flange 62. Since such a steering knuckle 46 is used in two mirror-symmetrical design variants in motor vehicles, the opening 70 is used correspondingly to receive a tightening screw inserted correspondingly mirror symmetrically to the tightening screw 63 or the threaded section of that tightening screw, which projects on the opposite side, when the support body 1 is attached to a steering knuckle 46 represented symmetrically to the embodiment according to FIG. 5.

The support body 1 of such a design can be pushed with its cavity 68 according to FIG. 5 over the bearing eye 45 in such a fitting manner that the threaded holes 8 and 16 of its two support walls 2 and 3 will be positioned coaxially to the central longitudinal axis 71 of the mounted tightening screw 63. At the same time, the spacer sleeves 29 and 30 with their pressure screws 33 are aligned coaxially to the central longitudinal axes 72 and 73 of the two bearing bores 47 and 48. The two tightening screws [sic—pressure screws—Tr.Ed.] 33 are now turned, of course, into the spacer sleeves 29 and 30 only to the extent that the attachment of the support body 1 to the bearing eye 45 is not hindered.

In this position of the support body 1, in which it is attached to the bearing eye 45, the guide cylinder 86 is screwed into the threaded hole 8 of the first support wall 2 to loosen the tightening screw 63. The length and the depth of screwing in of the threaded cylinder 86 are selected to be such that the threaded section 65 of the tightening screw 63 engages the threadless guide hole 99 of the threaded cylinder 86 and the support body 1 is thus fixed at the bearing eye 45 in its desired position. The guide cylinder 17 is also screwed in the same manner into the corresponding threaded hole 16 of the second support wall 3 until its stop flange 19 comes into contact with the second support wall 3 on the outside. In this maximally screwed-in position, the tightening screw 63 with its screw head 64 protrudes into the front end of the through hole 20 of the guide cylinder 17, so that the support body 1 is held by the screw head 64 at the bearing eye 45 by means of the guide cylinder 17 in a positive-locking manner and positioned in a defined manner.

The screw-down nut 91 can now be screwed onto the external thread 90 of the guide cylinder 86 until the stud 97 being displaced at the same time in the direction of arrow 74 comes into contact by the front surface 104 of its pressure piston 98 with the threaded section 65 of the tightening screw 63. By continuing to rotate the screw-down nut 91, the tightening screw 63 is thus inevitably loosened in the bearing eye 45, an impact screwdriver being preferably used for this further pressing-out operation. Due to the limited travel of the stud 97 in the guide cylinder 86, the tightening screw 63 cannot be pressed completely out of the bearing eye 45.

To accomplish this, provisions are made, e.g., to use studs with pressure pistons of various lengths one after another. In other words, when the maximum travel of the stud 97 is reached and the tightening screw 63 is pressed back by this travel in the bearing eye 45, the screw-down nut 91 is removed from the guide cylinder 86 and the stud 97 is replaced with a stud (not shown specifically in the drawing) that has a pressure piston that is longer by approximately the maximum travel. By tightening the screw-down nut 91 again, the tightening screw 63 is now displaced in the bearing eye by the amount of an additional travel. Using a corresponding number of studs of different lengths, whose length differs by approximately the amount of the travel, the tightening screw 63 can thus be pressed completely out of the bearing eye 45.

The second pressing device 5, which is already inserted on the support body 1 in FIG. 6, is provided as an alternative to this procedure. The guide cylinder 86 of the pressing device 85 is simply replaced with the threaded cylinder 6 of the pressing device 5 for this purpose, so that the pressing device 5 is now located in the first support wall 2 of the support body 1 instead of the pressing device 85. By simply turning in the pressing screw 7 in the axial direction indicated by arrow 74, the tightening screw 63 is now inevitably pressed out of the mounting holes and the clamping flanges 59 through 62, as is indicated by broken lines in FIG. 6. The length of the pressing screw 7 is selected here to be such that the tightening screw 63 is pressed completely out of the clamping flanges 59, 60, 61 and 62 of the bearing eye 45.

To reliably prevent the clamping slots 57 and 58 of the bearing eye 45, which are located between the clamping flanges 59 and 60 as well as 61 and 62, from being compressed during this pressing-out operation, two spacer plates 75 and 76 are provided in this exemplary embodiment, which can be pushed fittingly radially into one of the clamping slots 57 and 58 from the outside. The rear wall 4 of the support body 1 has two through holes 77 and 78 for this purpose, through which the spacer plates 75 and 76 can be pushed and thus can be caused to fittingly engage the clamping slots 57 and 58. To facilitate the handling of these spacer plates 75 and 76, these are provided with a stepped, approximately cylindrical grip part 79 and 80, respectively, by which reliable handling of the spacer plates 75 and 76, is ensured, especially during the removal and pulling out from the clamping slots 57 and 58. If necessary, these grip parts 79 and 80 may also be used as striking surfaces, e.g., in order to drive the spacer plates 75 and 76 into the clamping slots 57 and 58, e.g., by hammer blows, e.g., in the case of heavy contamination of the clamping slots 57 and 58.

After the tightening screw 63 has been pressed out completely, the pressing screw 7 is again screwed back against the arrow 74 at least until its front end ceases to be located in the area of the two bearing bores 47 and 48 any more. However, the pressing screw 7 may nevertheless protrude into the mounting hole of the clamping flange 62, so that the support body 1 is still held at the bearing eye 45 in an accurately positioned manner. After the pressing screw 7 has been screwed back, the two pressure screws 33 are now screwed upward in the direction of arrow 81, as a result of which the two pivot pins 49 and 50 are pressed out of the bearing bores 47 and 48. After screwing back the two pressure screws 33 into the starting position shown in FIG. 6 as well as after the screwing back of the pressing screw 7 into the starting position shown in FIG. 6, the support body 1 can be removed from the bearing eye 45 in a simple manner.

FIG. 6 also shows that the threaded cylinder 6 and the guide cylinder 17 are dimensioned such that in the attached state of the support body 1 and with the threaded cylinder 6 and the guide cylinder 17 screwed in completely, the bearing eye 45 with its two clamping flanges 59 and 62 is fittingly received between these. This also applies to the guide cylinder 86, which may be screwed into the support wall 2 as a replacement for the threaded cylinder 6.

Thus, extremely simple and reliable removal of the tightening screw 63 as well as of the pivot pins 49 and 50 can be carried out by means of the device according to the present invention as described above.

Furthermore, the design of the pressing device 85 according to the present invention makes it possible to loosen the fastening screw 63 in the bearing eye 45 of the shock absorber 25 in a simple manner, because extremely strong pressing forces can be exerted by the pressing device 85 in conjunction with the support body 1 on the fastening screw 63. Furthermore, extremely variable use of the device according to the present invention is made possible by the guide cylinder 86 and mounting cylinder 17, which can be screwed into the support walls 63, because these can be adapted to fastening screws 63 of various sizes in a simple manner due to replaceable mounting cylinders and pressing devices 85 as well as 5 of various sizes being provided.

The use of the pressing device 85 according to the present invention is not limited to the bearing eye 45 of a shock absorber 25 or of a steering knuckle 46, which are shown only as examples. The special design of the support body 1, adapted to the bearing eye 45, is only an example as well. The pressing device 85 can also be used with other holding devices which may be tightly attached to a bearing eye of another design or in the area of mounting holes of a tightening screw or fastening screw.

While specific embodiments of the invention have been shown and described in detail to illustrate the application of the principles of the invention, it will be understood that the invention may be embodied otherwise without departing from such principles.

What is claimed is:

1. A device for removing a screw or a tightening screw or fastening screw of a pivot pin or the axle component of a motor vehicle or axle screw or pin tightly seated in a mounting hole of a bearing eye, the device comprising:

a support body having a lateral support wall, with which support wall the support body can be attached to the bearing eye in the area of the screw;

a pressing device provided with the support body, the pressing device acting on the screw, the pressing device including a guide cylinder, a stud guided axially displaceably in said guide cylinder for loosening and/or pressing out the screw, and a screw-down nut screwable onto the guide cylinder provided with a pressing surface acting on the stud.

2. A device in accordance with claim 1, wherein said support body has an additional, second support wall extending in parallel to said support wall, and said pressing device is arranged approximately concentrically to said second support wall, opposite said support wall.

3. A device in accordance with claim 1, wherein said guide cylinder of said pressing device forms a separate component, which is screwed replaceably into said second support wall, and said second support wall is provided with a opening, through which the tightening screw is pressed during a pressing out.

4. A device in accordance with claim 3, wherein said opening of said second support wall is for receiving the screw head of the tightening screw or fastening screw and is a mounting hole, by which the support body is held in an accurate position at the bearing eye at least at the beginning of the pressing out of the tightening screw, and said mounting hole is arranged coaxially to said pressing device of the first support wall.

5. A device in accordance with claim 2, wherein the opening of the second support wall is part of a separate mounting cylinder inserted replaceably into the second support wall.

6. A device in accordance with claim 4 wherein the guide cylinder and the mounting cylinder can be screwed mutually interchangeably into the first or second support wall as needed.

7. A device in accordance with claim 6, wherein said guide cylinder and said mounting cylinder are screwed into the support wall to the extent that the bearing eye is received more or less fittingly between the guide cylinder and the mounting cylinder.

8. A device in accordance with claim 1, wherein said stud is formed of a hardened steel.

9. A device in accordance with claim 1, wherein:

said guide cylinder defines a guide hole, a diameter of said guide hole is adapted to a diameter of the screw to be loosened, the screw including a threaded section, said threaded section being arranged in said guide hole;

said stud has a pressure piston guided in said guide hole of the guide cylinder.

10. A device in accordance with claim 2, wherein said lateral support walls are rigidly connected to one another via a rear wall and an upper and lower support wall, which extend approximately at right angles to the rear wall and to the lateral support walls, and one of the upper or lower support walls is provided with a pressing-out device for pressing out a pivot pin, and the other of the upper or lower support walls has an approximately U-shaped opening, with which the support wall partially surrounds the pivot pin in the attached state at the bearing eye.

11. A device in accordance with claim 10, wherein:

one of the upper or lower support walls defines a threaded hole;

said pressing-out device includes a pressure screw, which can be screwed through said threaded hole of one of the upper or lower support walls to press out the pivot pin.

12. A device in accordance with claim 11, wherein said threaded hole is part of a spacer sleeve, which, directed outward, is tightly fastened to one of the upper or lower support walls and which extends coaxially to the bearing bore of the pivot pin in the state in which the support body is attached to the bearing eye.

13. A device in accordance with claim 12, wherein the threaded hole of the spacer sleeve has a radially expanded, threadless guide section toward the support wall, and said pressure screw is provided with a threadless pressing section, which can be pressed through the bearing bore of the bearing eye.

14. A device in accordance with claim 10, wherein a plurality of the bearing bores are provided for a plurality of pivot pins in a bearing eye, and a plurality of said pressing-out devices are provided, each of which is associated with a pivot pin for pressing out, are provided corresponding to the number of the pivot pins to be pressed out.

15. A device in accordance with claim 3, wherein mutually interchangeable pressing devices having a plurality of designs are provided.

16. A device for removing a screw seated in a mounting hole of a bearing eye, the device comprising:

a support body having a lateral support wall for attaching said support body to the bearing eye in the area of the screw;

a pressing device for acting in cooperation with said support body for acting on the screw, said pressing device including a guide cylinder, a stud guided axially displaceably in said guide cylinder for loosening and/or pressing out the screw, and a screw-down nut screwable onto the guide cylinder, said screw-down nut being provided with a pressing surface acting on the stud.

17. A device in accordance with claim 16, wherein said support body has an additional, second support wall extending in parallel to said support wall, said pressing device being arranged approximately concentrically to said second support wall, opposite said support wall.

18. A device in accordance with claim 16, wherein said guide cylinder of said pressing device forms a separate component, which is screwed replaceably into said second support wall, and said second support wall is provided with an opening, through which the tightening screw is pressed during a pressing out.

* * * * *